United States Patent [19]

Neilson

[11] Patent Number: 5,439,289
[45] Date of Patent: Aug. 8, 1995

[54] APPARATUS FOR MIXING INGREDIENTS IN A RECEPTACLE

[76] Inventor: Jim L. Neilson, 9205 Lime Crest Ct., Elk Grove, Calif. 95624

[21] Appl. No.: 267,452

[22] Filed: Jun. 28, 1994

Related U.S. Application Data

[63] Continuation-in-part of Ser. No. 42,519, Apr. 5, 1993, Pat. No. 5,328,263.

[51] Int. Cl.⁶ .......................... B01F 7/32; B01F 13/00
[52] U.S. Cl. ................................ 366/207; 366/206; 366/286; 366/347
[58] Field of Search ............... 366/197, 203, 206, 207, 366/240, 241, 242, 244, 245, 247, 249–252, 254, 255, 261, 347, 286

[56] References Cited

U.S. PATENT DOCUMENTS

| | | | |
|---|---|---|---|
| 53,952 | 4/1866 | Cox | 366/347 |
| 1,691,843 | 11/1928 | Dehuff | 366/203 |
| 2,324,179 | 7/1943 | Srob | 366/206 |
| 2,431,298 | 11/1947 | Nichols | 366/197 |
| 4,547,076 | 10/1985 | Maurer | 366/244 |
| 4,671,172 | 6/1987 | Stiglich | 366/197 |
| 4,822,175 | 4/1989 | Barnard | 366/206 |
| 5,067,819 | 11/1991 | Heinhold | 366/197 |
| 5,150,967 | 9/1992 | Neilson et al. | 366/197 |

FOREIGN PATENT DOCUMENTS

1022796 3/1966 United Kingdom ................ 366/197

Primary Examiner—David A. Scherbel
Assistant Examiner—Terrence R. Till
Attorney, Agent, or Firm—Thomas R. Lampe

[57] ABSTRACT

Apparatus for mixing ingredients in a receptacle includes a lid having an aperture which is engaged by the receptacle when the receptacle is raised. A mixer shaft extends downwardly through the lid aperture and the shaft is movable relative to both the lid and to the receptacle to permit a mixer head connected to the shaft to move downwardly and upwardly within the receptacle after the lid has engaged the receptacle.

3 Claims, 11 Drawing Sheets

APPARATUS FOR MIXING INGREDIENTS IN A RECEPTACLE

This invention is a continuation-in-part of U.S. patent application Ser. No. 08/042,519, filed Apr. 5, 1993, now U.S. Pat. No. 5,328,263, issued Jul. 12, 1994.

TECHNICAL FIELD

This invention relates to apparatus for mixing ingredients in a receptacle. The invention has particular application to the blending of ice cream into milk shakes and malts.

BACKGROUND ART

U.S. Pat. No. 5,150,967, issued Sep. 29, 1992, discloses a milk shake machine for mixing thick, hard ice cream shakes. The machine incorporates a housing to which a container is locked and sealed, the container being in a suspended, elevated condition. Two gear motors are disposed within the housing, one employed to rotate a shaft and mixing head and the other to move the mixing head vertically within the container.

Also known in the prior art are conventional milk shake machines consisting of an electric motor, shaft, and mixing disc. The device is supported on a stand or hangs from a wall bracket. When one wishes to make a hard ice cream milk shake, a metal cup is manually held under the revolving shaft and disc while the cup is manually manipulated vertically and in a stirring motion. This method is time consuming and inefficient and may even introduce foreign matter into the mixture as a result of the mixing head coming into contact with the sides of the metal cup.

While the milk shake machine disclosed in U.S. Pat. No. 5,150,967 has a number of advantages over the conventional prior art milk shake machines, it too has certain deficiencies, not the least of which is the fact that the cup or receptacle is not positively supported on its bottom, but rather is suspended from its upper end in mid air. This approach can result in spillage if the user does not properly connect the receptacle to the housing. Some difficulties may also arise with respect to cleaning of the housing structure at the point of attachment of the container or receptacle to the housing.

DISCLOSURE OF INVENTION

The present invention relates to apparatus for mixing ingredients in a receptacle, such as hard ice cream in a milk shake, wherein the receptacle is positively supported on its bottom during the mixing operation. Furthermore, the apparatus is easy to clean and maintain and does not require the services of an attendant during operation thereof.

The apparatus is for mixing ingredients in a receptacle having a receptacle bottom and side wall defining an interior and an opening communicating with said interior.

The apparatus includes a support and also a lid having a top wall defining an aperture, the lid being positioned over the receptacle. The support includes a support portion for supporting the receptacle and moving the receptacle.

Support portion placement means moves the receptacle relative to the lid between a lower position wherein the lid is not in engagement with the receptacle to an upper position wherein the lid is positively engaged by the receptacle to close the receptacle opening.

A mixer shaft is supported by the support and extends through the lid aperture. The mixer shaft is movable relative to the lid and to the receptacle and has a lower end. A mixer head is connected to the shaft lower end under the lid.

Transport means is connected to the support for transporting the mixer shaft and mixer head downwardly within the receptacle after the lid has been engaged by the receptacle. Rotating means is provided for rotating the mixer shaft and mixer head within the receptacle.

Other features, advantages, and objects of the present invention will become apparent with reference to the following description and accompanying drawings.

BEST MODE FOR CARRYING OUT THE INVENTION

Referring now to the drawings, a preferred form of apparatus constructed in accordance with the teachings of the present invention includes a support comprising a housing 10. The form of apparatus illustrated is a milk shake mixing machine; however, it will be understood that the teachings of the invention are applicable to any type of apparatus for mixing ingredients in a receptacle, for example a food blender.

The support or housing 10 has a platform 12 for supporting a receptacle in the form of a cup or container 14, it being understood that the receptacle is manually positioned on and removed from the platform. Receptacle 14, as is conventional, has a bottom and side wall defining an interior and an opening at the upper end thereof communicating with the interior.

Receptacle 14, when positioned on platform 12, is disposed under a lid 16 having a top wall 18. A tapered wall having a circular cross section extends downwardly from top wall 18 and is designated by reference numeral 20. Tapered wall 20 has a lower rim 22 which is of a size and configuration corresponding to the top of the receptacle 14. That is, the rim 22 of lid 16 will engage the receptacle side wall when the lid and receptacle are axially aligned and brought into engagement. A recess 24 is defined by the top wall and tapered wall of the lid.

Lid 16 is connected to and supported by a cylindrically-shaped lid support element 26 which is mounted for reciprocal up and down movement within an enlargement 28 comprising part of the housing 10. Up and down movement of the lid support element 26 and the lid 16 is effected by a crank arm 30 affixed to a cap 32 which in turn is affixed to lid support element 26. The upper end of crank arm 30 is connected to a stub shaft 34 on a rotatable gear or drive element 36 driven by a gear mounted on the drive shaft of electric motor 38 through an intermediate gear. It will be appreciated that the aforedescribed mechanism operates as an eccentric drive which will move the lid 16 relative to the support from an elevated position (shown in FIGS. 1, 6A, and 6F) wherein the lid is not in engagement with receptacle 14 to a lower position (shown in FIGS. 3A and 3B, for example) wherein the lid engages the receptacle to close the receptacle opening at the top of the receptacle.

Lid top wall 18 defines an aperture 40 therein which communicates with the lid recess 24. A mixer shaft 42 is disposed within aperture 40. A mixer head 44, which will be described in greater detail below, is connected to the shaft lower end under the lid top wall. The shaft 42 is freely rotatable within aperture 40 of the lid.

Mixer shaft 42 passes upwardly through and is rotationally movable relative to a pair of bushings 46, 48 which are connected together in axial alignment with the throughbores thereof also in axial alignment. It will be noted that bushing 48 accommodates an O-ring 50 of rubber, plastic or other suitable resilient material which will serve to wipe the shaft 42 when it is moved axially relative to the bushings 46, 48. Preferably, bushing 48 is removable, so that the O-ring can be replaced and cleaning facilitated.

The upper end of mixer shaft 42 is supported by and rotatably journaled in a circular ball bearing 56 within a support housing 54. Support housing 54 has two bearings 58 which slidably receive guide posts 60. A bolt extends outwardly from housing 54 and projects through a slot 62 defined by a link arm 64 pivoted about pivot shaft 66 connected to mounting plate 68.

Link arm 64 is pivotally connected by pivot pin 70 to a second link arm 72. The other end of second link arm 72 is pivotally connected by pivot pin 74 to a crank arm 76. Crank arm 76 is fixedly connected to the output shaft of a gear motor 78 attached to mounting plate 68. It will be appreciated that rotation of crank arm 76 by gear motor 78 will result in movement of link arm 64 to reciprocally pivot the link arm 64 between the upper position shown in FIG. 3A and the lower position shown in FIG. 3B. Movement of the link arm 64 from its upper position to its lower position will cause support housing 54 to move downwardly, the path of movement being linear due to the cooperation between bearings 58 and guide posts 60. Return of the link arm 64 to its upper or elevated position will cause the support housing 54 to move to its upper position shown in FIG. 3A. Since the mixer shaft 42 is supported by support housing 54, the mixer shaft and mixer head will move up and down correspondingly.

Figure 2A:
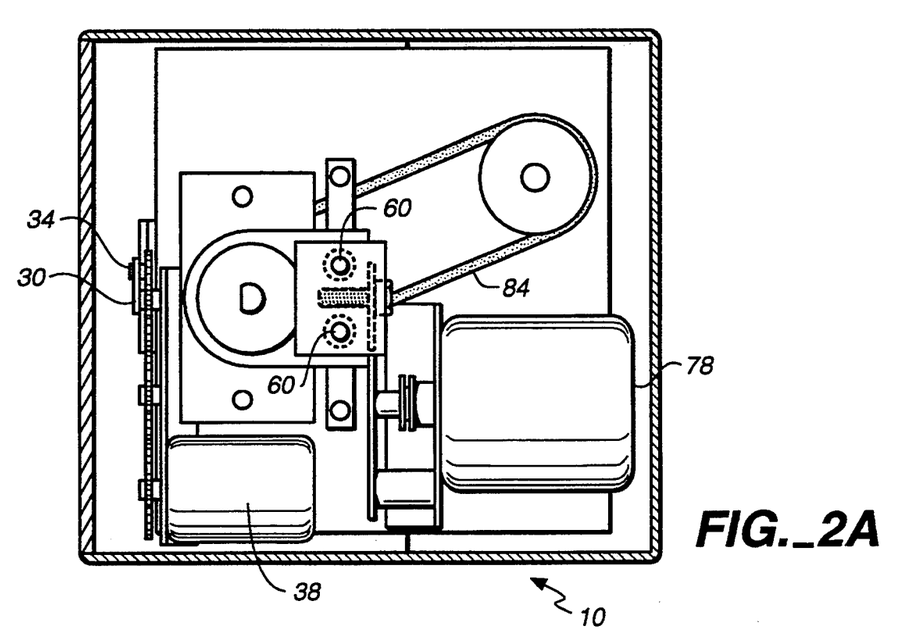
FIGS. 2A and 2B are cross-sectional views taken, respectively, along the lines 2A—2A and 2B—2B in FIG. 1.
Figure 2B:
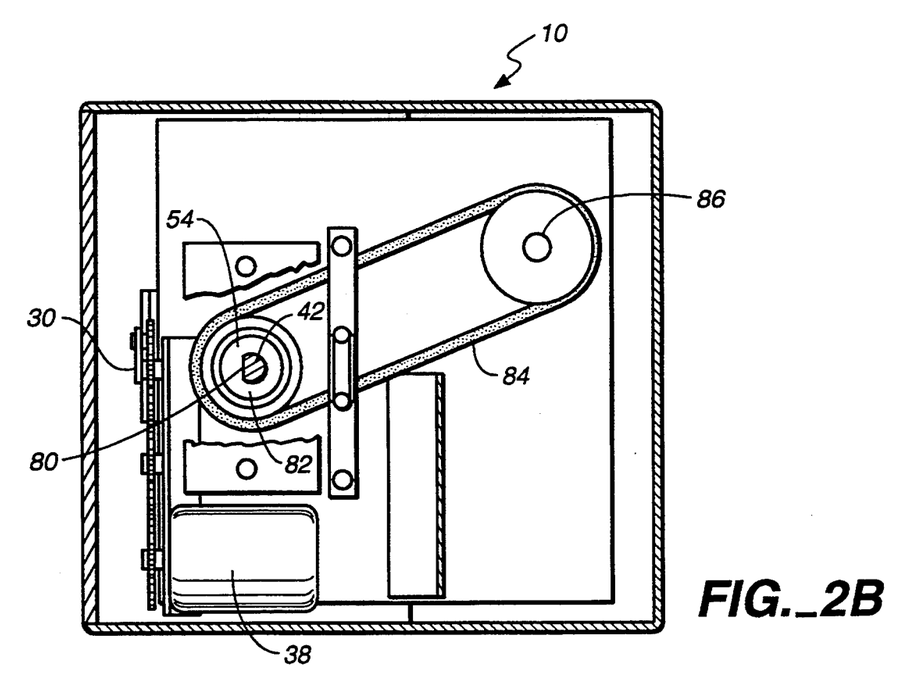

At the upper end thereof, mixer shaft 42 has a flat side 80 (FIG. 2B). The top portion of the mixer shaft extends downwardly through a spline bearing 82. Spline bearing 82 permits free up or down motion of the mixer shaft but is operable to transmit rotational torque to the mixer shaft. Such rotation is effected by a drive belt 84 positioned about the rotatable spline bearing 82 and also about the output shaft of an electrical motor 86. When motor 86 is actuated, the belt will rotate with the output shaft of the motor and rotate spline bearing 82, in turn rotating mixer shaft 42 and mixer head 44.

Figure 1:
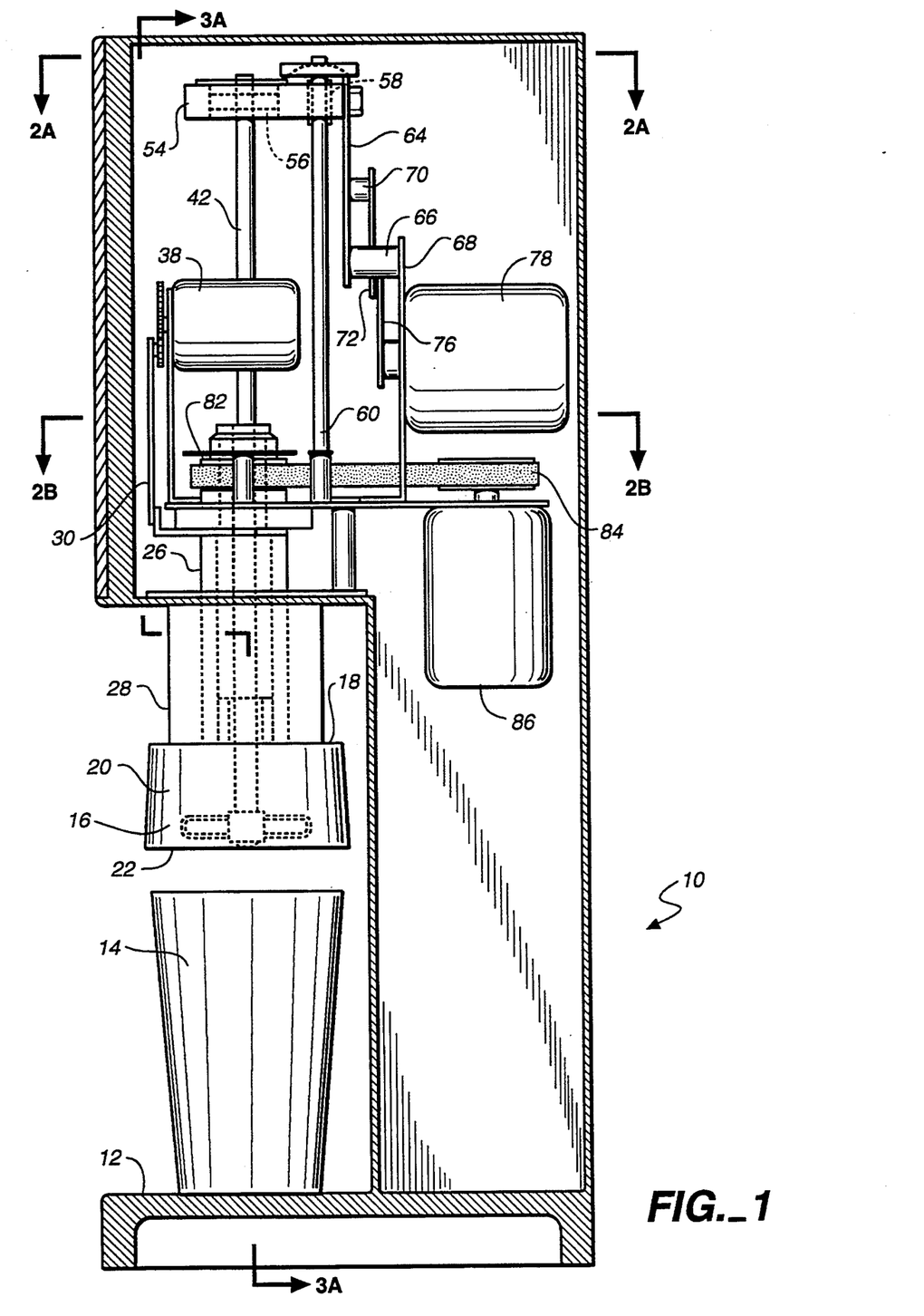
FIG. 1 is a side elevational view, with housing shown in cross section, of a milk shake machine constructed in accordance with the teachings of the present invention.
Figure 3A:
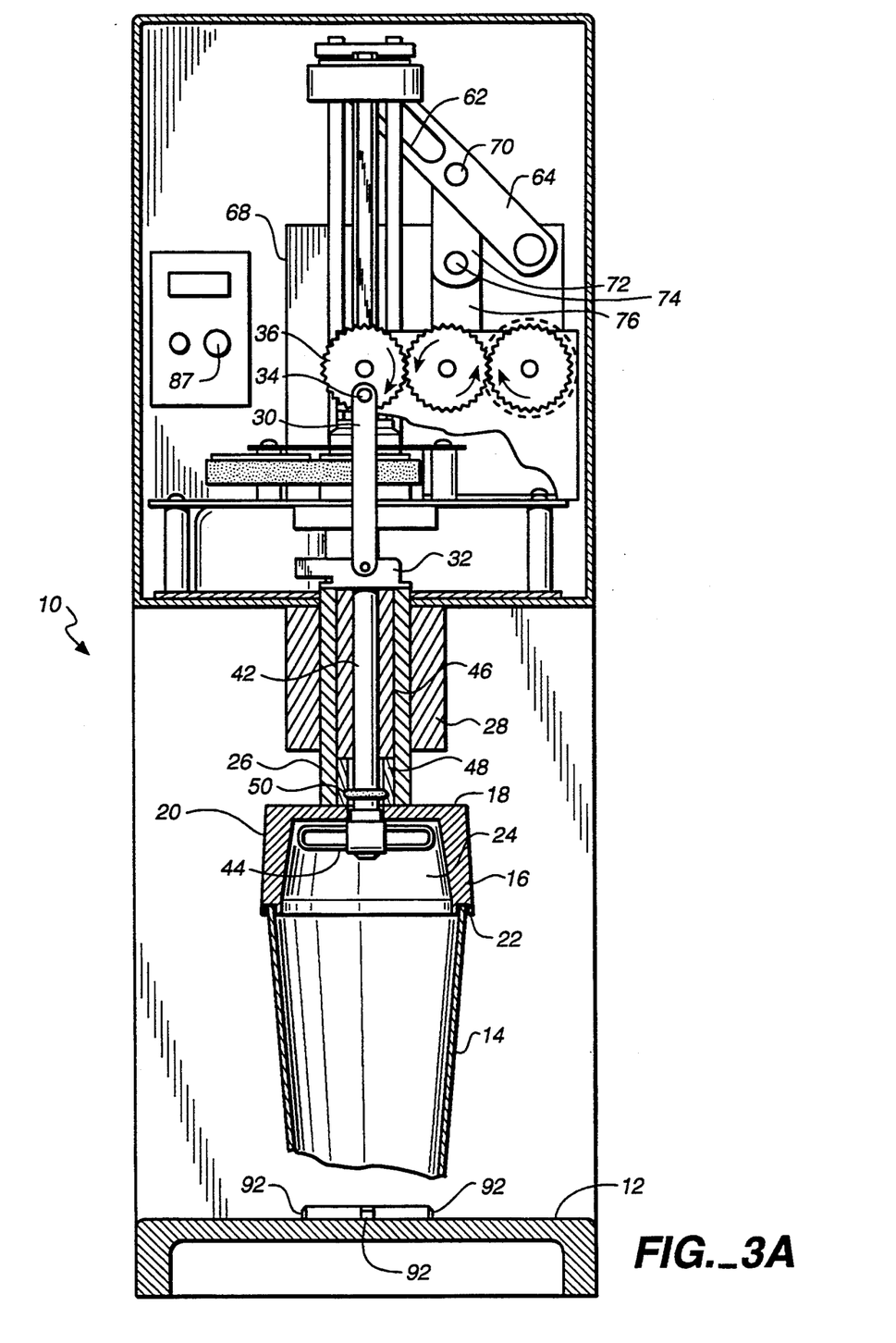
FIG. 3A is a cross-sectional view taken along the line 3A—3A in FIG. 1 and illustrating selected components of the machine in the relative positions assumed thereby during one phase of operation of the machine.
Figure 6A:
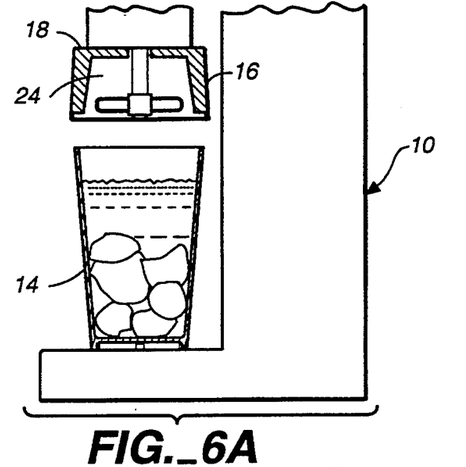
FIGS. 6A through 6F are schematic diagrams illustrating the sequential stages of operation of the apparatus with respect to selected components thereof.
Figure 6B:
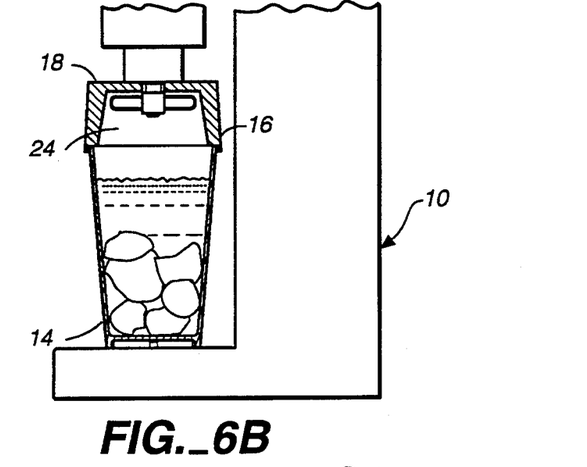

Having described operative components of the apparatus, the operation thereof will now be set forth. First, the operator places a receptacle 14 under the lid 16 when the lid is in the raised position as shown in FIGS. 1 and 6A. The operator then initiates operation by energizing electric motor 38 to lower the lid 16 and bring it into engagement with the side wall of the receptacle 14 as shown in FIGS. 3A and 6B. It should be noted that downward movement of the lid 16 is also relative to the stationary mixer shaft 42. Thus, the mixer head 44 is disposed at the lower end of the lid recess prior to downward movement of the lid so that the mixer head will not interfere with such downward movement and will end up being closely adjacent to the top wall 18 of the lid when the lid rim engages the receptacle.

Figure 3B:
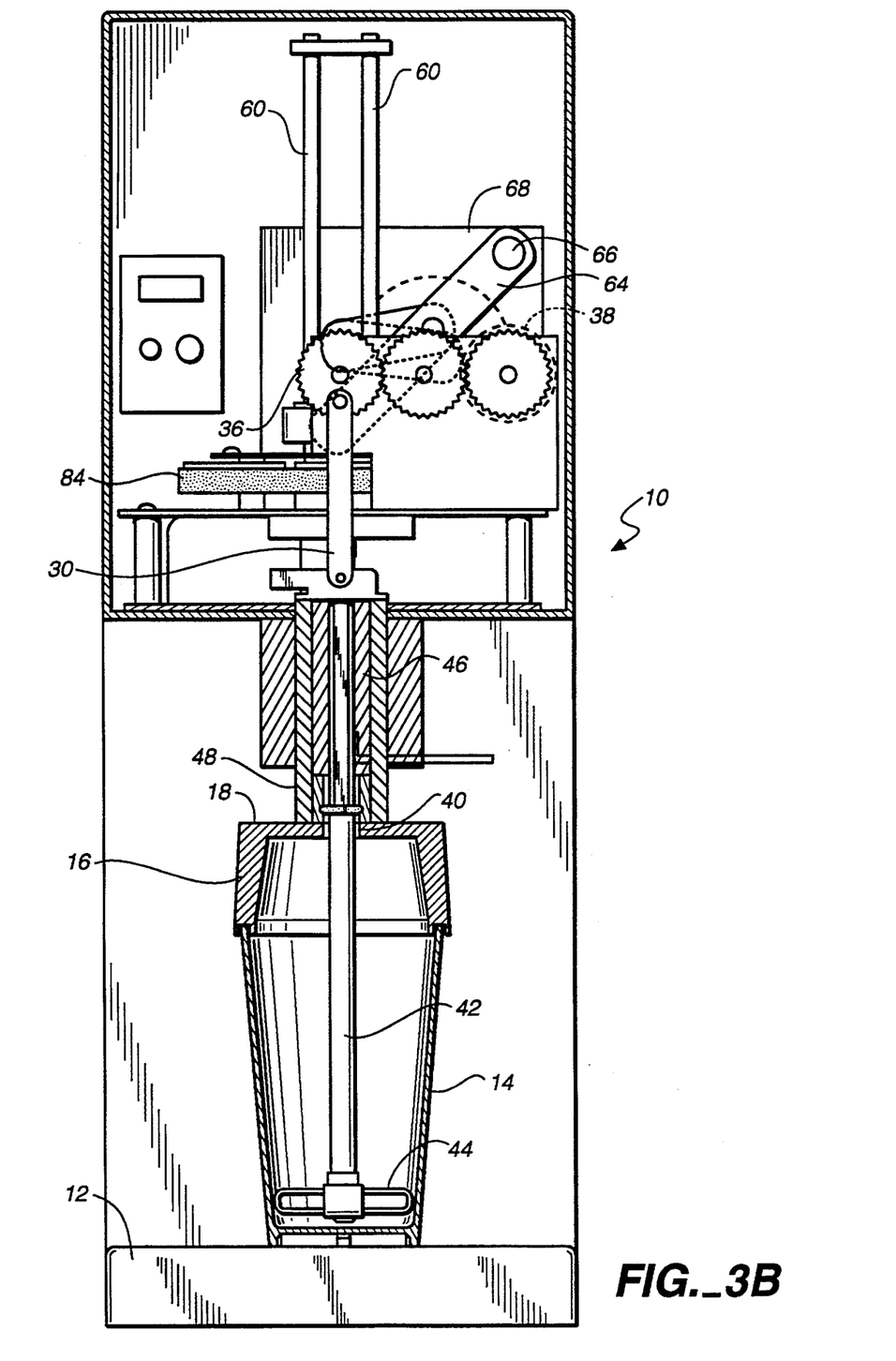
FIG. 3B is a view similar to FIG. 3A but illustrating the selected components of the machine in the relative positions assumed thereby during another phase of the operation of the machine.
Figure 6C:
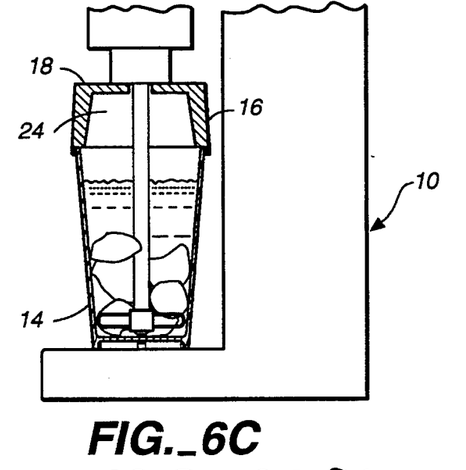
Figure 6D:
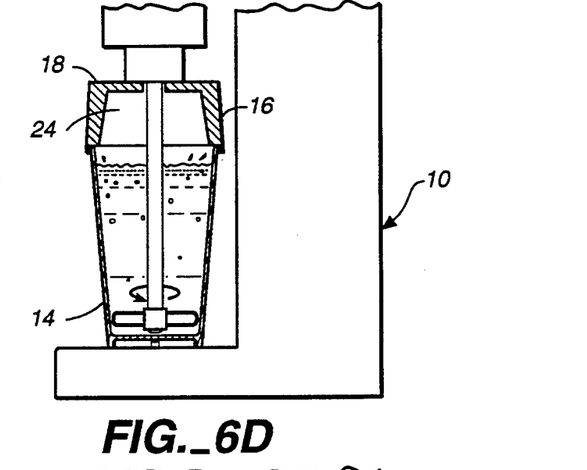

Next, the electric motor 86 is actuated to rotate the mixer shaft and mixer head and the gear motor 78 is energized to move the mixer shaft and mixer head downwardly as shown in FIGS. 3B and 6C to bring the rotating mixer head closely adjacent to the bottom of the receptacle. Rotation is continued as shown in FIG. 6D to thoroughly mix the contents of the receptacle.

Figure 6E:
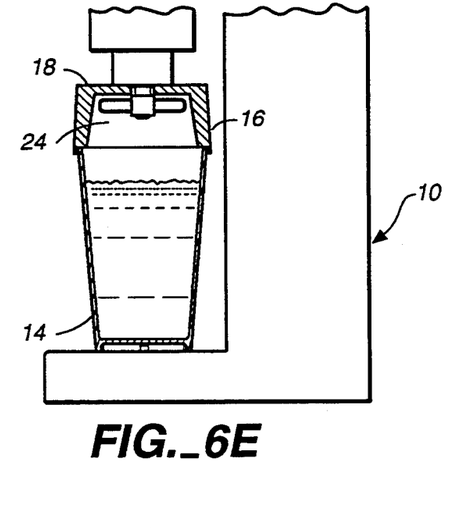

Next, the mixer shaft and mixer head are moved upwardly under the continuing action of gear motor 78 to move the mixer head up to the top of the lid recess as shown in FIG. 6E. The electric motor 86 is then de-energized to stop rotation of the mixer shaft and mixer head.

It will be noted that the mixer head is closely adjacent to both the top wall and tapered wall of the lid when the mixer head is at its uppermost position and the lid is still in engagement with the receptacle. This promotes the removal of excess material from the mixer head and allows such material to drip down into the receptacle.

As mentioned above, the O-ring 50 also contributes to the cleaning of the apparatus and more particularly of the mixer shaft since it exerts a wiping action on the shaft as the shaft is drawn upwardly.

Figure 6F:
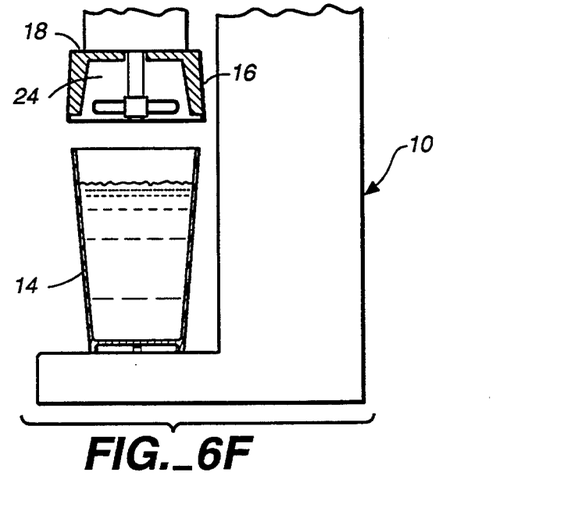

Finally, the lid placement means including motor 38 and crank arm 30 pulls the lid 16 to its elevated position shown in FIG. 6F.

Figure 7:
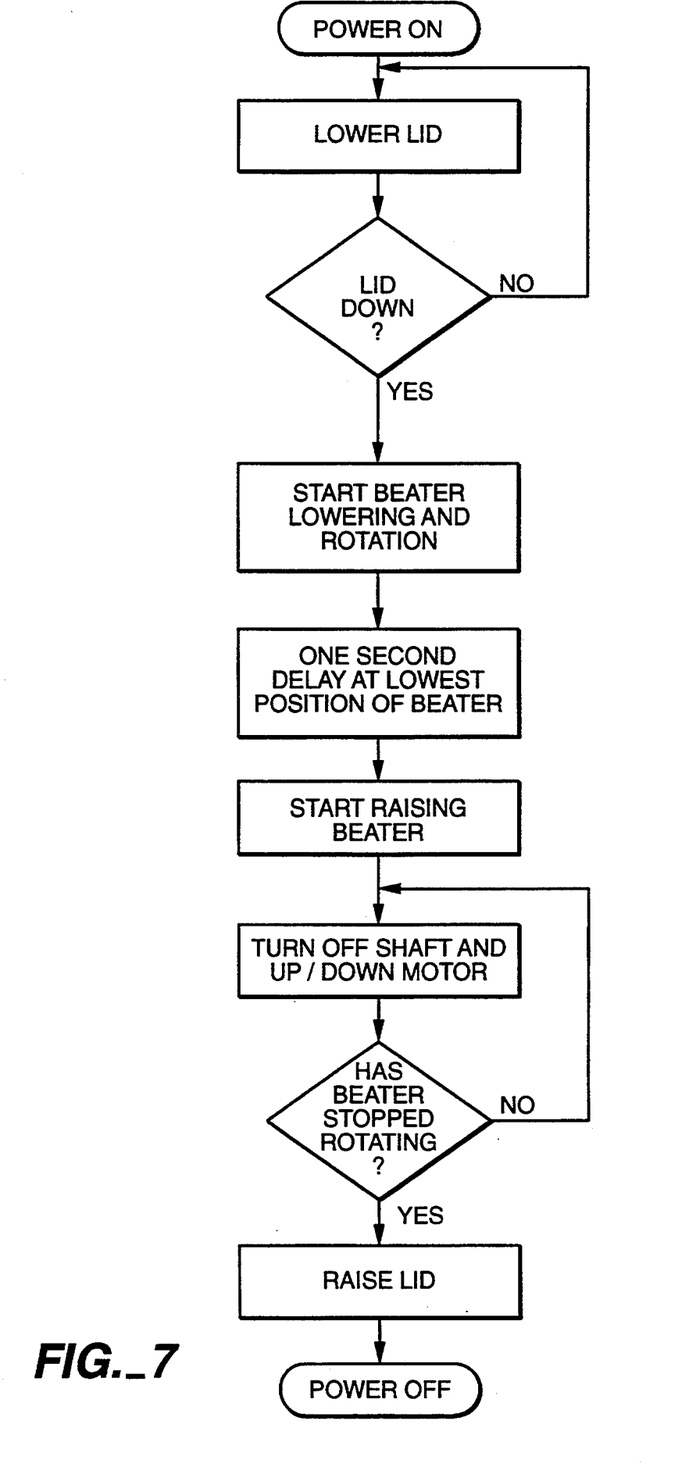
FIG. 7 is a flow diagram illustrating the operational sequence of the apparatus.
Figure 8:
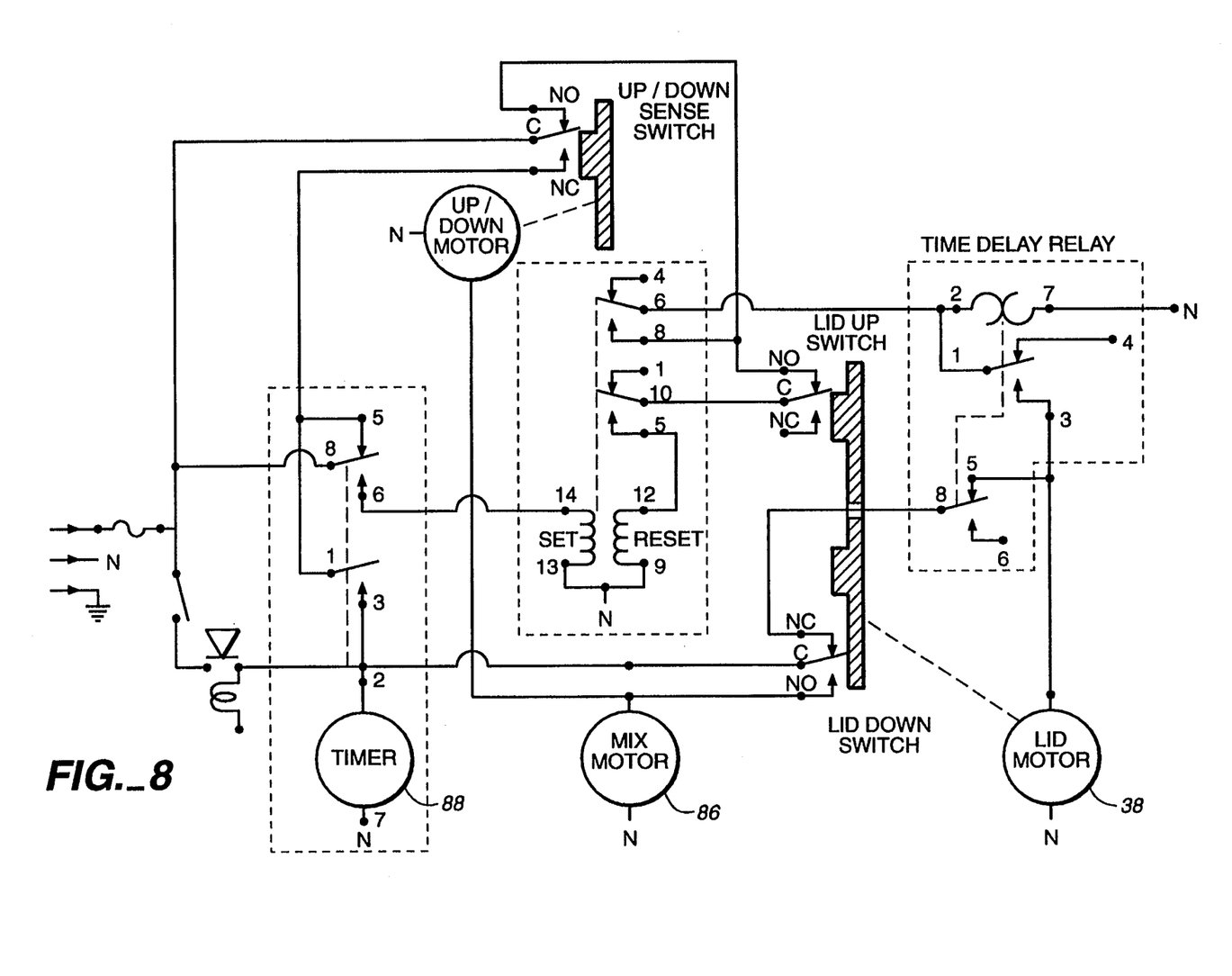
FIG. 8 is a circuit diagram employed to operate the apparatus.

It is anticipated that the foregoing sequence of operations is carried out automatically upon initial actuation of the device by the operator, as by means of a push button or switch, such as that designated by reference numeral 87. Such sequence is illustrated diagrammatically in FIG. 7. A circuit diagram of a circuit which may be employed for such purpose is illustrated in FIG. 8. It will be noted that the circuit incorporates a timer 88 to run the machine through as many cycles as deemed appropriate by the operator. However, in the case of milk shakes, one cycle of approximately 10 seconds duration will prepare a high quality shake, even when employing hard ice cream.

Figure 4:
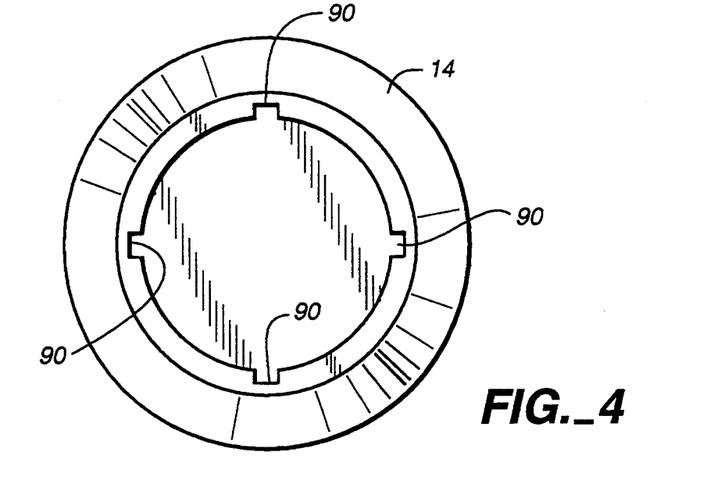
FIG. 4 is an enlarged bottom view of the receptacle employed with the apparatus.

Means is provided to prevent rotation of cup or receptacle 14 during the mixing operation so that the operator need not manually hold and maintain the receptacle in place and against such rotation. More specifically, in the arrangement illustrated, the bottom of the receptacle has indents 90 formed at the bottom thereof at spaced locations about the bottom. These indents 90 receive corresponding detents or projections 92 located on and projecting upwardly from platform 12 of the support. In addition to preventing rotation of the receptacle, the indents and detents cooperate to ensure that the receptacle is properly placed relative to the platform and thus relative to the lid and mixer head.

Figure 5:
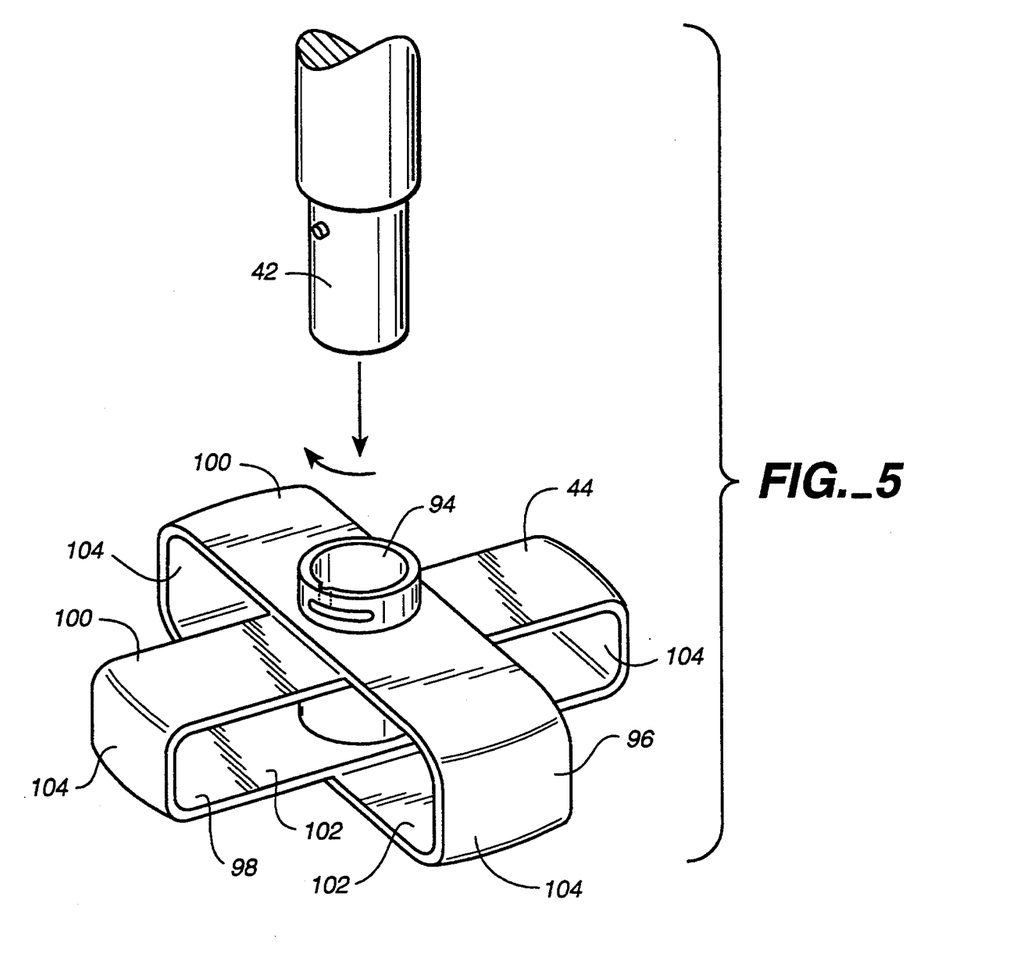
FIG. 5 is a greatly enlarged top perspective view of the mixer head of the apparatus and mixer shaft.

FIG. 5 shows details of the mixer head 44. The mixer head includes a cylindrical portion 94 which receives the lower end of the mixer shaft 42. A quick release mechanism such as the pin and slot arrangement illustrated may be employed to removably secure the cylindrical portion to the shaft end. Two bands 96, 98 of stainless steel or the like are secured to the cylindrical portion 94. Each band includes an upper band wall 100, a lower band wall 102, and spaced side band walls 104 connected to the upper and lower band walls. The walls of each band define a loop of generally rectangular, cross-sectional configuration. Each band is elongated and has a primary axis, the bands being affixed to each other at the centers of the upper and lower band walls with the primary axes of the bands disposed at right angles. It has been found that a mixer head construction of the type shown provides for highly efficient and effective mixing of ingredients and readily lends itself to cleaning.

Figure 9A:
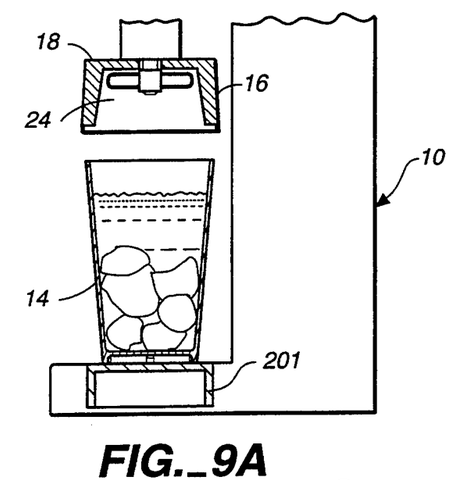
FIGS. 9A through 9F are schematic diagrams illustrating the sequential stages of operation of selected components of an alternative embodiment of the invention.
Figure 9B:
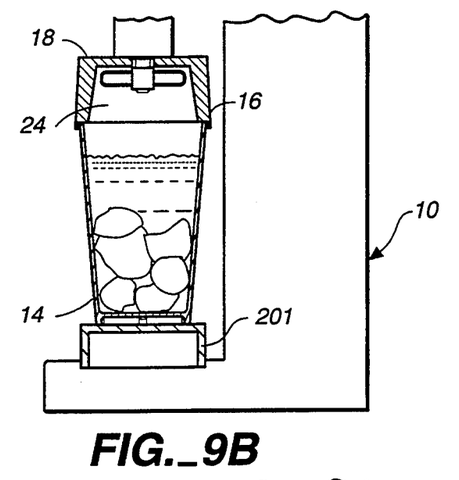
Figure 9C:
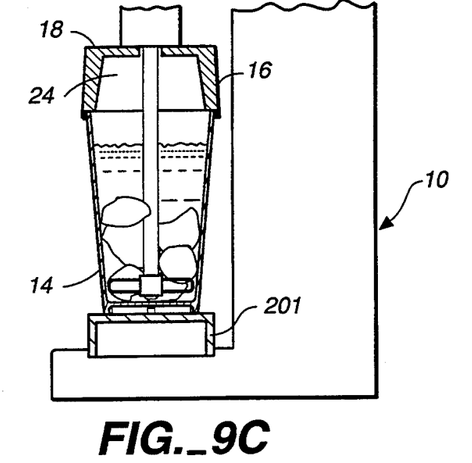
Figure 9D:
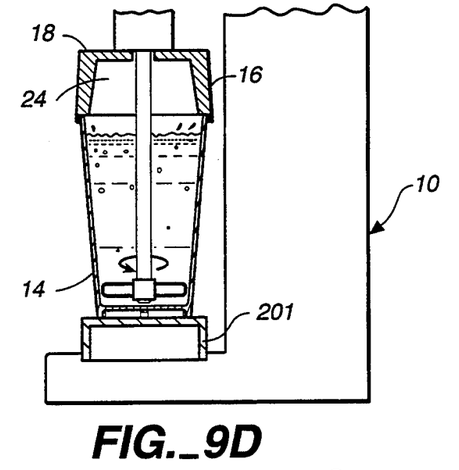
Figure 9E:
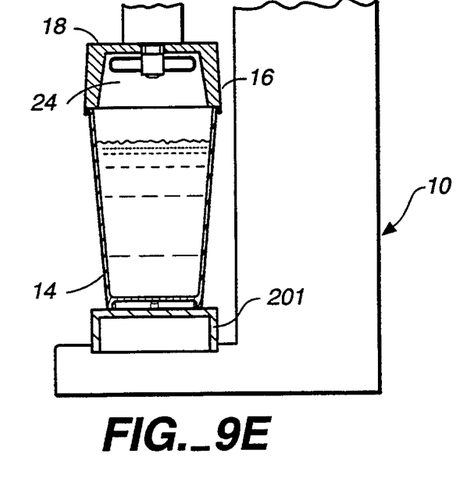
Figure 9F:
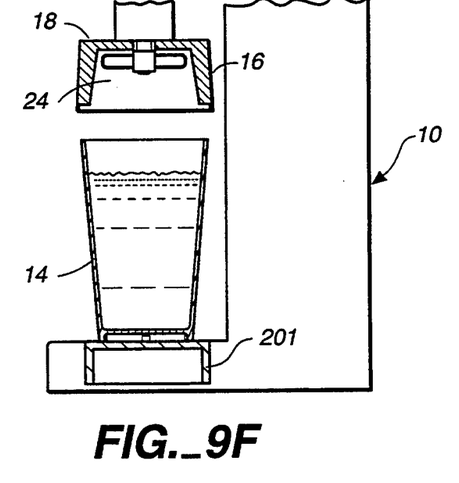
Figure 10:
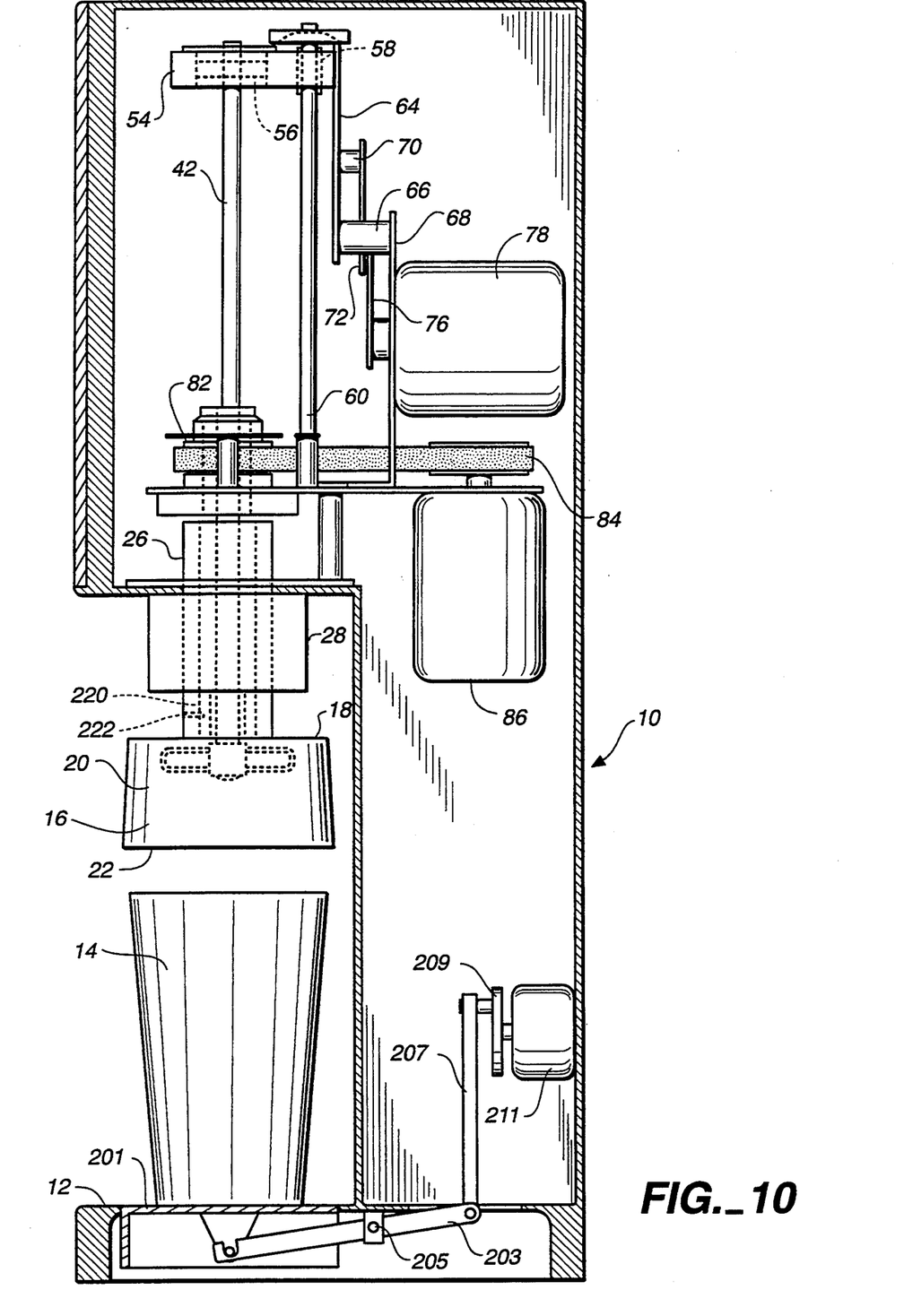
FIG. 10 is a side elevational view of the alternative embodiment, with housing shown in cross section.
Figure 10A:
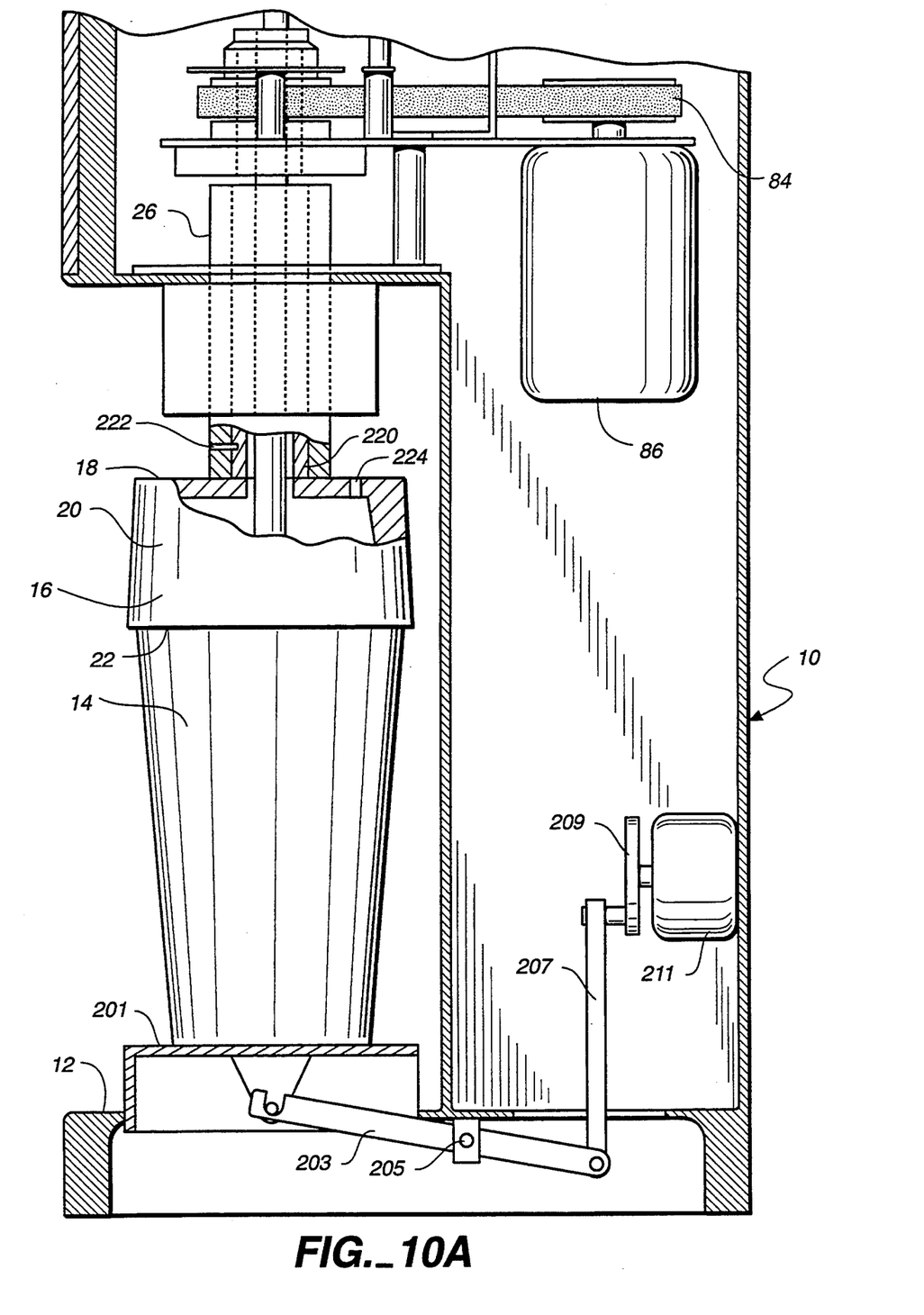
FIG. 10A is a view similar to FIG. 10 but illustrating a receptacle supported by a support portion raised and in engagement with a lid.

FIGS. 9A through 10A illustrate an alternative arrangement wherein the lid 16 is fixed in position on the support 10. In this particular embodiment, the receptacle 14, rather than the lid, moves to bring the receptacle and lid into positive, sealed engagement. FIGS. 9A and 10 show the receptacle 14 in lowered condition prior to engagement between the lid 16 and the receptacle 14. Receptacle 14 is on a support portion 201 which is moveable relative to the rest of the support from the lower position of FIGS. 9A and 10 to the elevated position of FIGS. 9B and 10A.

Support portion 201 is in engagement with a crank arm 203 pivoted about pivot 205. The end of the arm 203 remote from support portion 201 is connected to a link 207 connected to a rotor 209 on the output shaft of a step motor 211. Activation of motor 211 and 180 degree movement of rotor 209 will serve to move the support portion 201 and receptacle 14 between elevated and lowered positions.

FIGS. 9C through 9F show the sequence of events occurring after engagement between the receptacle and lid. In FIGS. 9C through 9E, the mixer shaft is lowered, rotated and raised relative to the lid and receptacle in the manner discussed with respect to the first embodiment of the invention. The same mechanism for axially moving and rotating the mixer shaft may be employed in this embodiment and will not be described. In FIG. 9F, the support portion and receptacle have been lowered after mixing of the receptacle contents.

As noted, in this embodiment of the invention the lid 16 does not move during operation of the device, being secured in position relative to support 10 by the support element including member 26. Preferably, the lid is readily detachable for cleaning, and any suitable means may be utilized for this purpose. For example, in the alternative embodiment a boss 220 is fixedly secured to lid 16 and held in place by a set screw 222 threadably engaged with member 26. A conventional bayonet connector arrangement could also be employed.

Lid 16 of the alternative embodiment also includes an air hole 224 in the lid providing communication between the lid recess and the ambient atmosphere. This will not only accommodate overrun during mixing but prevent a vacuum from developing between the lid and receptacle and consequent difficulties in removing the receptacle.

I claim:

1. Apparatus for mixing consumable ingredients, said apparatus comprising, in combination:

a support including a support portion for selectively releasably supporting a receptacle at a support location on said support portion, said receptacle including a receptacle bottom and a receptacle side wall having a rim, said receptacle bottom and said receptacle side wall defining an interior for containing consumable ingredients to be mixed by said apparatus and said rim defining an opening communicating with said interior;

a lid supported by said support over said support location of said support portion having a lid top wall defining an aperture and defining a lid recess extending downwardly from and communicating with said aperture, said lid recess terminating at a lower lid opening spaced from and larger than said aperture, and defined by said lid at the bottom of said lid, said lid top wall positioned over a receptacle when a receptacle is supported by said support portion at said support location;

support portion placement means for moving said support portion relative to said lid from a lower position wherein said lid is not in engagement with a receptacle supported by said support portion to an elevated position wherein the receptacle supported by said support portion is fixedly disposed between and in engagement with both said support portion and said lid and wherein said lid is positively engaged with and seals said receptacle to substantially close said receptacle opening and said lid opening and wherein said lid top wall is located above the rim of the receptacle and said recess is disposed above the receptacle interior and in communication therein;

an elongated mixer shaft supported by said support and extending through the lid aperture, said mixer shaft axially and rotatably movable relative to said lid and relative to the receptacle and having a lower end;

a mixer head connected to said shaft lower end under said lid top wall;

transport means connected to said support for transporting said mixer shaft and mixer head downwardly and then upwardly within said receptacle after said lid has been positively engaged by and forms a seal with the receptacle supported by said support portion caused by movement of said support portion from said lower position to said elevated position, said mixer head being closely adjacent to said lid top wall and spaced upwardly from the rim of the receptacle both prior to downward transport of said mixer shaft and said mixer head by said transport means and after upward transport of said mixer shaft and said mixer head by said transport means; and rotating means for rotating said mixer shaft and mixer head within the receptacle, said support portion placement means operable to move said support portion from said elevated position to said lower position to disengage the receptacle from said lid, break the seal between the receptacle and said lid, and lower the receptacle away from said lid after termination of rotation of said mixer shaft and mixer head by said rotating means.

2. The apparatus according to claim 1 additionally comprising releasable connector means for releasably connecting said lid to said support.

3. The apparatus according to claim 1 wherein said lid defines an air hole providing communication between said recess and the ambient atmosphere.

* * * * *